W. H. MARTIN.
BALANCING SIGNALING SYSTEMS.
APPLICATION FILED DEC. 19, 1918.

1,395,854.

Patented Nov. 1, 1921.

INVENTOR.
W. H. Martin
BY
ATTORNEY

UNITED STATES PATENT OFFICE.

WILLIAM H. MARTIN, OF NEW YORK, N. Y., ASSIGNOR TO AMERICAN TELEPHONE AND TELEGRAPH COMPANY, A CORPORATION OF NEW YORK.

BALANCING SIGNALING SYSTEMS.

1,395,854.  Specification of Letters Patent.  Patented Nov. 1, 1921.

Application filed December 19, 1918. Serial No. 267,516.

*To all whom it may concern:*

Be it known that I, WILLIAM H. MARTIN, residing at New York, in the county of Bronx and State of New York, have invented certain Improvements in Balancing Signaling Systems, of which the following is a specification.

This invention relates to signaling systems in which a balance is desired between two lines, usually a real line and an artificial line as in duplex operation. It is especially useful in connection with ocean cable signaling although it is by no means limited to use in that connection.

In duplex operation it is necessary to have an artificial line or impedance network which is designed or adjusted to have the same impedance throughout the range of frequencies employed as the impedance of the real line. For signaling over land lines it is usually sufficient to provide for this purpose a comparatively simple impedance network, but for telegraphy over long submarine cables it is usually necessary to obtain a much finer balance than is possible with the networks used on land lines, because the arriving current is very small compared to the outgoing current. In duplex operation of submarine cables therefore, an artificial line is usually provided which consists of a large number of sections, each comprising the usual series and shunt impedances, the whole being designed to equal the constants of the actual cable as nearly as can be determined from measurements made before the cable is laid. As a result of the irregularities and variations in the actual cable and the artificial cable, the degree of balance obtained even with these more elaborate artificial lines is still so imperfect that the unbalance constitutes a limiting factor in the speed of operation possible over the cable. It is the object of the present invention to improve the degree of balance obtainable in such circuits and thereby make it possible to increase the speed of signaling over ocean cables and similar circuits.

Figure 1:
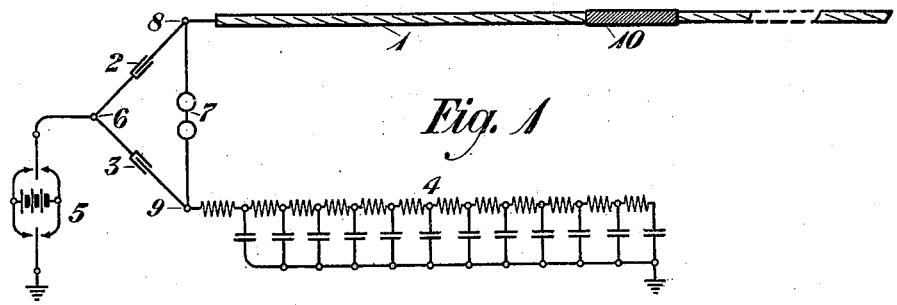
Figure 4:
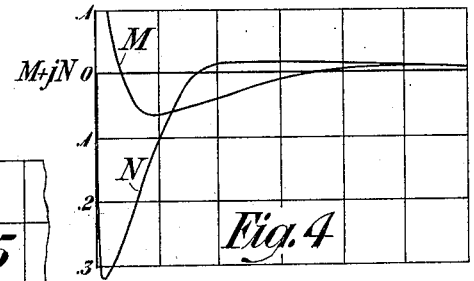
Figure 5:
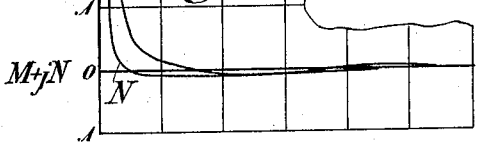
Figure 6:
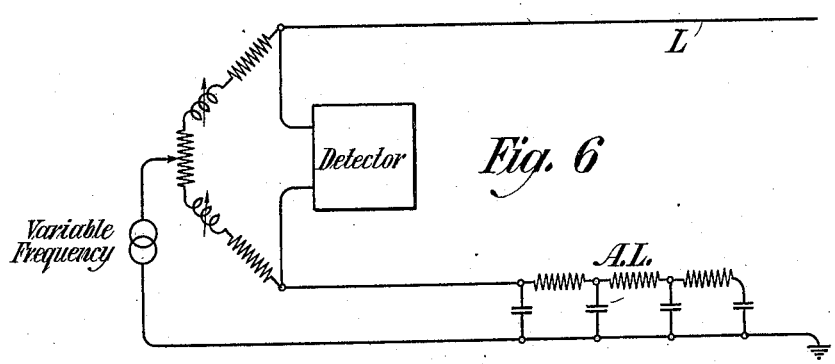

The invention will be described in connection with the accompanying drawings whereinin Figure 1 illustrates diagrammatically a duplex cable circuit to which the invention is applicable, Figs. 2, 3, 4 and 5 are diagrams serving to explain the method of operation and Fig. 6 is a diagrammatic illustration showing an arrangement for making the measurements used in carrying out the invention.

In Fig. 1 the real line 1, here represented as a cable circuit, is provided with the usual duplex set comprising the ratio arms 2 and 3 and the artificial line 4; the sending apparatus 5 being connected to the junction 6 of the ratio arms and the receiving device 7 being connected across their extremities 8 and 9. Section 10 of cable 1 is intended to represent an irregularity in the line such as might be caused for instance in repairing the cable by the insertion of a section having slightly different constants. Objectionable irregularities may arise from faults resulting in leakage or even arise from differences of temperature of the water at different points or from variations in the depth of water in which it is laid.

The artificial line 4 represents the usual artificial line used in duplex cable operation. It is composed of a large number of sections, giving a fairly close simulation of the real line as originally laid. If a high degree of balance is desired however, any irregularity in the impedance, such as represented at 10 in Fig. 1, must be represented in the artificial line by a similar irregularity at a distance from the end of the artificial line corresponding electrically to the location of the irregularity in the main line.

Figure 2:
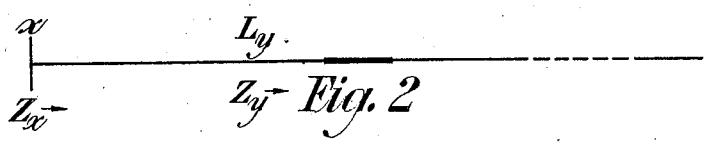

The method by which the location of such an irregularity in the real line may be determined will be understood from the following. In Fig. 2, L represents an infinitely long line, the impedance of which at $x$ is $Z_x$ and at $y$ is $Z_y$, in the direction away from $x$ the distance between $x$ and $y$ being $d$. Let the portion of the line between points $x$ and $y$ be uniform, the characteristic impedance for which at an infinite length is $Z_c$, and let W represent the amount of an irregularity, *i. e.*, the amount by which the constants for a given unit of length differ from the constants of a unit of uniform line. It will be understood that the impedance $Z_x$ may be readily measured from the end of the line in the usual manner. The impedance $Z_y$ cannot, of course, ordinarily be measured, since even if the point of the irregularity is known it is usually inaccessible in cable circuits. A knowledge of its value beforehand is, of course, not essential to the exercise of this invention. The propagation in which $e$ is the base of the Naperian logarithms. This may ze derived from Fleming's formula for the propagation of telephone current in cables. ("*The Propagation of Electric Current in Telephone and Telegraph Conductors*" by J. A. Fleming, second edition, page 87.)

$$Z_1 = Z_0 \frac{Z_T \cosh Pl + Z_0 \sinh Pl}{Z_0 \cosh Pl + Z_T \sinh Pl}$$

or $$Z_1 = \frac{Z_T + Z_0 \tanh Pl}{1 + \frac{Z_T}{Z_0} \tanh Pl}$$

in which the characters $Z_1$, $Z_0$, $P$ and $l$ correspond respectively to $Z_x$, $Z_c$, $\alpha$, $d$ as above defined and used, and in which $Z_T = Z_y = Z_c + W$;—that is the impedance at $y$ differs from the characteristic impedance by the amount of the irregularity $W$.

Rewriting the above equation with these characters we may put $$Z_x = \frac{Z_c + W + Z_c \tanh \alpha d}{1 + \frac{Z_c + W}{Z_c} \tanh \alpha d}$$

$$Z_x - Z_c = \frac{W(1 - \tanh \alpha d)}{1 + \frac{(Z_c + W)}{Z_c} \tanh \alpha d}$$

Assuming that $W$ is small in magnitude compared with $Z_c$, as it usually is, we may then take $$Z_x - Z_c = W \frac{1 - \tanh \alpha d}{1 + \tanh \alpha d}$$

Now $$e^u = \cosh u + \sinh u \quad (14)$$

and $$e^u = \cosh u - \sinh u \quad (16)$$

(Fleming *supra* pp. 20 and 21)

hence $$e^u = 1 + \tanh u \quad (14a)$$

and $$e^u = 1 - \tanh u \quad (16a)$$

constant, $\alpha$, of the uniform line is $a + j^b$ in which "$a$" represents the attenuation constant and "$b$" the wave length constant, $j$ being $\sqrt{-1}$. The impedance $Z_y$ differs from $Z_c$ because of some abnormality in the constants of the cable beyond the point $y$. For this condition, it has been found that the difference between impedance $Z_x$ and impedance $Z_c$ is given by the following formulæ, $$Z_x - Z_c = (Z_y - Z_c)e^{-2\alpha d} = (Z_y - Z_c)e^{-2ad}\underline{/-2bd} \quad (1)$$

Dividing 14a by 16a $$e^{-2u} = \frac{1 - \tanh u}{1 + \tanh u}$$

$$\therefore Z_x - Z_c = W e^{-2\alpha d}$$

from which we have equation (1) above by substituting $(Z_y - Z_c)$ for $W$ $$Z_x - Z_c = (Z_y - Z_c)e^{-2\alpha d} = (Z_y - Z_c)e^{-2ad}\underline{/-2bd}$$
$$= (Z_y - Z_c)e^{-2ad}(\cos + j \sin)(\overline{-2bd})$$
$$= (Z_y - Z_c)e^{-2ad}(\cos 2bd - j \sin 2bd)$$

or putting $$A = e^{-2ad} \cos 2bd$$
$$B = -e^{-2ad} \sin 2bd$$

and $$(Z_x - Z_c) = M + jN$$
$$M + jN = (Z_y - Z_c)(A + jB)$$

If R, L, C, and S represent respectively the resistance, inductance, capacity and leakage of the cable per unit length, and $\omega = 2\pi f$ in which $f$ is frequency, we have, $$Z_c = \sqrt{\frac{R + j\omega L}{S + j\omega C}}$$

(Compare Fleming *supra* p. 72.)

Assuming, as is justifiable in most cases, that the leakage and inductance of the cable are negligible compared to the resistance and capacity, we may conveniently determine how the A and B factors vary. Under this assumption, at any frequency $f$ $$Z_c = \sqrt{\frac{R}{j\omega C}} = \sqrt{\frac{R}{2\pi C}} \sqrt{\frac{1}{f}} \underline{/45°}$$

Likewise $$\alpha = \sqrt{(R + jwL)(S + j\omega C)}$$

(See Fleming *supra* p. 68) and with the same assumption we find:

$$\alpha = a + jb = \sqrt{jRC\omega} = \sqrt{\pi RCf} + j\sqrt{\pi RCf}$$

Figure 3:
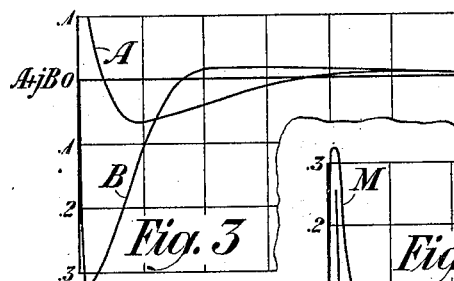

Fig. 3 shows the variation of A and B. It will be noted that both tend to oscillate because of the sine and cosine factors but the attenuation is so great that only two peaks appear on a curve of the scale shown. As $a$ and $b$ both increase as the square root of the frequency the variation of A and B is not periodic, but successive peaks are increasingly farther apart.

It can be shown from the expressions for A and B that the locations of the peaks are a function of $d$ but that the magnitude of any particular peak, such as the first is always the same. It is evident, then that the application of these operators A and B to $(Z_y - Z_c)$ can be made to show by the values of $(Z_x - Z_c)$ the location, type and magnitude of the irregularity at point $y$.

Thus the location of the first peak may be obtained as follows:

Differentiating A with respect to $d$ and solving for the value of $f$ at the first peak it is found that the first peak occurs when $$\tan 2bd = -\frac{a}{b}$$

or if $a = b$ $$2bd = \frac{3\pi}{4}$$

$$d = \frac{3}{8}\sqrt{\frac{\pi}{RCf}}$$

and $$f = \frac{9\pi}{64RCd^2}$$

Substituting this value of $f$ in the expressions for $a$ and $b$ it is found that $$a = b = \frac{3\pi}{8d}$$

so that for this value of $f$ $$A^1 = e^{\frac{-3\pi}{4}} \cos \frac{3\pi}{4} = -e^{\frac{-3\pi}{4}} \cos \frac{\pi}{4} = -.067$$

Similarly treating the expression for B, it will be found that the value of the frequency for the first peak in the curve for B, is that which makes $$\tan 2bd = \frac{b}{a}$$

or if $b = a$ $$2bd = \frac{\pi}{4}$$

$$d = \frac{1}{8}\sqrt{\frac{\pi}{RCf}}$$

and $$f = \frac{\pi}{64RCd^2}$$

for which $$a = b = \frac{\pi}{8d}$$

Using this value for $f$, the value of B is $$B^1 = -e^{\frac{-\pi}{4}} \sin \frac{\pi}{4} = -.322$$

In similar manner the location of succeeding peaks or of the zero points may be obtained.

The following is a tabulation of the location and the magnitude of the peaks and zero points of the curves for A and B as calculated from the formulæ above given.

|  | A. |  | B. |  |
|---|---|---|---|---|
|  | Frequency. | Magnitude. | Frequency. | Magnitude. |
| 1st zero | $(2)^2$K* | 0 | $(0)^2$K | 0 |
| 1st peak | $(3)^2$K | −.067 | $(1)^2$K | −.322 |
| 2nd zero | $(6)^2$K | 0 | $(4)^2$K | 0 |
| 2nd peak | $(7)^2$K | +.0029 | $(5)^2$K | +.0139 |
| 3rd zero | $(10)^2$K | 0 | $(8)^2$K | 0 |

*$K = \frac{\pi}{64RCd^2}$

If the irregularity is due to excess resistance at point $y$ then $$Z_y - Z_c = r$$

and $$Z_x - Z_c = M + jN = r(A + jB)$$
$$M = rA$$
$$N = rB$$

Therefore the peaks in the curves for M and N come at the values of $f$ computed above for A and B and the magnitude of $r$ is given by the value of M at the first peak divided by .067 or in a corresponding manner by the value of N at the first peak divided by .322. Curves for M and N are shown by Fig. 4, the excess series resistance being assumed to be 1 ohm. This factor being unity gives the curves their identity in amplitudes to those of Fig. 3.

If the irregularity is due to too little resistance at point $y$ then the signs of M and N will be the reverse of the values given above for A and B.

If the irregularity is due to an excess shunt capacity $C_1$ at point $y$, then $$Z_y = \frac{j\frac{Z_c}{\omega C_1}}{Z_c - j\frac{1}{\omega C_1}}$$

and $$Z_y - Z_c = \frac{j\frac{Z_c}{\omega C_1}}{Z_c - j\frac{1}{\omega C_1}} - Z_c = \frac{-Z_c^2}{Z_c - j\frac{1}{\omega C_1}}$$

these expressions being derived from the well-known relation $$\frac{1}{Z_y} = \frac{1}{Z_c} + \frac{1}{-j\frac{1}{\omega C}}$$

If $\frac{1}{\omega C_1}$ is large compared to $Z_c$ as would be the case in general because $C_1$ would be small, the expression can be written $$Z_y - Z_c = \frac{-Z_c^2}{-j\frac{1}{\omega C_1}} = \frac{-\frac{R}{j\omega c}}{-j\frac{1}{\omega C_1}} = -\frac{RC_1}{C}$$

A shunt capacity at point $y$ therefore has the same effect as a decrease in the resistance of magnitude $\frac{C_1}{C} R$ and can be so treated.

Similarly a decrease in the capacity at point $y$ is equivalent to an excess resistance of magnitude $\frac{C_1}{C} R$.

Therefore if the values of M and N have values corresponding to those discussed above for A and B the irregularity is due to either too much series resistance or too little shunt capacity. If the values of M and N correspond in magnitude but have opposite signs the irregularity is due to too little resistance or too much capacity at point $y$. In either case the irregularity may be balanced by a corresponding change in either the series resistance or the shunt capacity of the artificial line at the proper point, the proper point being given by the indicated value of $d$.

If the irregularity is due to shunt resistance i. e. leakage the curve for M and N will be as shown in Fig. 5. A shunt leak S at point $y$ will make $$Z_y = \frac{Z_c S}{Z_c + S}$$

and $$Z_y - Z_c = \frac{Z_c S}{Z_c + S} - Z_c = \frac{-Z_c^2}{Z_c + S}$$

these equations being derived from the well-known relation $$\frac{1}{Z_y} = \frac{1}{Z_c} + \frac{1}{S}$$

If S is large compared to $Z_c$ then the expression may be written $$Z_y - Z_c = -\frac{Z_c^2}{S} = -\frac{R}{C\omega} \underline{|90°} \over S$$

$$(Z_y - Z_c) = -\frac{R}{CS\omega}\underline{|-\frac{\pi}{2}} = \frac{R}{CS\omega}\underline{|\frac{\pi}{2}}$$

In this case the value of $(Z_y - Z_c)$ will decrease with frequency.

Substituting this value of $Z_y - Z_c$ in equation (1) we get $$M + jN = \frac{R}{CS\omega} e^{-2ad} \underline{|\frac{\pi}{2} - 2bd}$$

$$= \frac{R}{CS\omega} e^{-2ad} (\sin 2bd + j \cos 2bd)$$

Letting $$M + jN = \frac{R}{CS\omega}(A^1 + jB^1)$$

$$A^1 = e^{-2ad} \sin 2bd$$

The first peak in $A^1$ occurs when $$\tan 2bd = \frac{b}{a} = 1 \text{ (if } b = a\text{)}$$

$$2bd = \frac{\pi}{4}$$

$$f = \frac{\pi}{64RCd^2}$$

$$A^1 = e^{-\frac{\pi}{4}} \sin \frac{\pi}{4} = .322$$

Therefore the value of M at the first peak will be $$M^1 = \frac{R}{2\pi CS} \cdot \frac{.322}{f}$$

Similarly if $$B^1 = e^{-2ad} \cos 2bd$$

The first peak in $B^1$ occurs when $$\tan 2bd = -\frac{a}{b} = -1 \text{ if } a = b$$

$$2bd = \frac{3\pi}{4}$$

$$f = \frac{9\pi}{64RCd^2}$$

$$B^1 = e^{-\frac{3\pi}{4}} \cos \frac{3\pi}{4} = -e^{-\frac{3\pi}{4}} \cos \frac{\pi}{4} = -.067$$

Therefore the value of N at the first peak will be $$N^1 = -\frac{R}{2\pi CS} \cdot \frac{.067}{f}$$

The following table will serve to compare the effects of different types of irregularities:

|  | Irreg. due to $+r$ or $-C_1$. | Irreg. due to $-r$ or $+C_1$. | Irreg. due to S. |
|---|---|---|---|
| Frequency of first peak. M N | $\frac{9K}{K}$* | $\frac{9K}{K}$ | $\frac{K}{9K}$ |
| Magnitude of first peak. M | $-.067\left(r \text{ or } \frac{C_1}{C}R\right)$ | $.067\left(r \text{ or } \frac{C_1}{C}R\right)$ | $.322\frac{R}{\omega CS}$ |
| N | $-.322\left(r \text{ or } \frac{C_1}{C}R\right)$ | $.322\left(r \text{ or } \frac{C_1}{C}R\right)$ | $-.067\frac{R}{\omega CS}$ |

* $K = \frac{\pi}{64RCd^2}$

It is evident from this table that an inspection of the curves for M and N will give not only the location of an irregularity but also its character and magnitude.

The inductance and leakage in the cable will have negligible or small effects at the lower frequencies but will become important with higher frequencies. The inclusion of these constants in the above formulæ will therefore affect the results derived for the higher frequencies and it will probably be necessary to take into account the inductance and leakage when a rigorous application is made of the relations discussed above. The derivation of the results given above will serve, however, to illustrate the method.

In finding out the location of a series resistance irregularity from the first peak in the curve for M, use is made of the relation that at the frequency at which the peak occurs $$\tan 2bd = -\frac{a}{b}$$

In any cable containing inductance and leakage the values of $a$ and $b$ can be determined for this frequency using the actual constants of the cable and the value of $d$ can be thus derived.

By the application of the method herein described the irregularities in the actual cable and also in the artificial line may be located by making impedance measurements of each and comparing the values obtained to those of the corresponding characteristic impedances. In doing this any of the usual types of alternating current bridges can be used.

The artificial line may be checked up in this way and after all undesired irregularities therein have been removed, it can be used as one of the bridge arms so that a direct measurement is made of the variation with frequency of the difference between the impedances of the actual and artificial cable. An inspection of this variation will give the place in the artificial line to locate an irregularity and will also indicate the character and magnitude of the irregularity which will be required to obtain a balance between the two cables. Fig. 6 shows one convenient way of using the artificial line as one of the bridge arms for such measurements. Other ways of using it for this purpose will be obvious.

If a number of irregularities exist in the same cable their combined effect will be equal to the sum of the effects produced by each irregularity separately. A curve of the combined effect can therefore be analyzed into its components and each irregularity treated separately.

It will be obvious that by the method above described a much finer degree of balance for ocean cables and like circuits may be secured than has hitherto been obtained and the speed of signaling may be correspondingly increased. This method of balancing the line may be used with the advantage both in the initial design of the artificial line and also in its adjustment from time to time as irregularities are introduced or variations occur in the actual cable.

What is claimed is:

1. The method of overcoming the effects of cable irregularities on the balance of a circuit involving the use of a balancing line which consists in determining the location of the irregularities in the cable, as well as their character and magnitude, and introducing irregularities of like character and magnitude into the balancing line at points therein whose electrical distances from the end at which the balance is to be produced, represent the distances of the respective irregularities from the same end of the cable.

2. The method of overcoming the effects of cable irregularities on the balance of a circuit involving the use of a balancing line which consists in determining the location and magnitude of the irregularities in the cable by measurements from the end of the cable at which the balance is to be produced. and introducing like irregularities into the balancing line at points therein whose electrical distances from the said end of the line represent the distances of the respective irregularities from the same end of the line.

3. The method of perfecting the balance in a circuit arranged for duplex operation which consists in locating irregularities in the balancing line and removing such irregularities therein as have no counterpart in the main line, then locating irregularities in the main line, and introducing into the artificial line like irregularities at electrical distances from the end of the line which respectively represent the distances of the irregularities in the main line from the same end.

4. The method of producing and preserving the balance in a duplex set for ocean cable circuits which consists in measuring the cable from time to time to locate irregularities in the impedance thereof and introducing into the balancing line corresponding irregularities at points therein which correspond electrically to the location of the irregularities found in the cable.

5. The method of overcoming the effects of cable irregularities on the balance of a circuit involving the use of a balancing line, which consists in determining by means of impedance measurements, the location, character and magnitude of irregularities in the cable, and introducing irregularities of like character and magnitude into the balancing line at points therein whose electrical distances from the end at which the balance is to be produced represent the distances of the respective irregularities from the same end of the cable.

6. The method of perfecting the balance in a circuit arranged for duplex telegraph operation which consists in determining the location, character and magnitude of differences between the actual and balancing lines by means of measurements of the difference between the impedance of the two lines, and making changes in the balancing line corresponding in magnitude and character to the differences so determined and at electrical distances from the end thereof corresponding to the location of the variations in the actual line.

7. The method of perfecting the balance between an actual and an artificial line comprising series and shunt impedances which consists in measuring the difference between the impedance of the two lines and making in the artificial line changes in the constants of the series and shunt impedance of the magnitude and character and at the electrical location indicated by said difference.

8. The method of overcoming the effects of cable irregularities on the balance of a circuit involving the use of a balancing line, which consists in determining, by means of alternating current impedance measurements, the location, character and magnitude of irregularities in the cable, and introducing irregularities of like character and magnitude into the balancing line at points therein whose electrical distances from the end at which the balance is to be produced, represent the distances of the respective irregularities from the same end of the cable.

9. The method of perfecting the balance in a circuit arranged for duplex telegraph operation which consists in determining the location, character and magnitude of differences between the actual and balancing lines by means of measurements of the difference between the alternating current impedance of the two lines, and making changes in the balancing line corresponding in magnitude and character to the differences so determined and at electrical distances from the end thereof corresponding to the location of the variations in the actual line.

10. The method of determining the transmission characteristics of a line which consists in measuring the impedance of a transmission line to alternating currents throughout a range of frequencies, noting the magnitude and sign of given peaks in the impedance values so obtained and the frequencies at which they occur, and determining from this the magnitude, character and location of the irregularities in said line.

In testimony whereof, I have signed my name to this specification this 16th day of December, 1918.

WILLIAM H. MARTIN.